United States Patent [19]
Shimazaki et al.

[11] Patent Number: 5,948,865
[45] Date of Patent: Sep. 7, 1999

[54] METHOD OF MANUFACTURING A CROSSLINKING FORMED BODY

[75] Inventors: Yukio Shimazaki, Hitachinaka; Hideki Yagyu, Hitachi; Masahiro Suzuki, Hitachi; Norio Tanioka, Hitachi; Kenji Hirose, Hitachi, all of Japan

[73] Assignee: Hitachi Cable, Ltd., Tokyo, Japan

[21] Appl. No.: 08/940,952

[22] Filed: Oct. 8, 1997

[30] Foreign Application Priority Data

Oct. 14, 1996 [JP] Japan ..................................... 8-271060

[51] Int. Cl.$^6$ .................................................. C08F 255/02
[52] U.S. Cl. .......................... 525/193; 525/100; 525/106; 525/194; 525/198; 525/209; 525/288; 264/331.15
[58] Field of Search ...................................... 525/288, 106, 525/105, 70, 209, 100, 198, 193, 194, 197

[56] References Cited

U.S. PATENT DOCUMENTS 5,112,918   5/1992   Boocock et al. ......................... 525/209

*Primary Examiner*—Mark L. Warzel
*Attorney, Agent, or Firm*—Antonelli, Terry, Stout & Kraus, LLP

[57] ABSTRACT

In order to provide a crosslinking formed body having a low hardness and superior tensile characteristics and rubber properties, an ethylene-α olefin copolymer, polypropylene, and an organosilane compound are graft polymerized in the presence of a free radical generating agent to form a reaction product, the reaction product is formed into a desired shape formed body, and the formed body is crosslinked by being exposed to moisture in the presence of a silanol catalyst.

16 Claims, No Drawings

METHOD OF MANUFACTURING A CROSSLINKING FORMED BODY

BACKGROUND OF THE INVENTION

The present invention relates to a method of manufacturing a crosslinking formed body having a low hardness, superior tensile characteristics, and rubber properties.

A silane water crosslinking formed body, which is obtained by the steps of graft polymerizing polyethylene, an ethylene group copolymer, such as an ethylene-vinyl acetate copolymer, an ethylene propylene rubber, and the like, or polyethylene derivatives, such as chlorinated polyethylene, and the like, with an organosilane compound in the presence of a free radical generating agent, forming a formed body of desired shape, and exposing the body to water in the presence of a silanol condensation catalyst to form a crosslinking formed body, is practically used in various fields; more particularly, a silane water crosslinking body of polyethylene is used as a cable insulator and for pipes. A silane water crosslinking body formed of a blended body of polyethylene and ethylene propylene rubber also is practically used as a flexible cable insulator.

However, the tensile strength of the silane water crosslinking body of ethylene group copolymer is lower in comparison with that of a non-crosslinking body. Particularly, the above tendency is significant with a silane water crosslinking body of the ethylene propylene copolymer. In order to prevent a decrease in the tensile strength, an inorganic reinforcing agent, such as carbon black and the like, or a crystalline polymer, such as polyethylene, have been conventionally added (JP-B-54-20235 (1979). As for the method of adding an inorganic reinforcing agent, a hygroscopic property of the reinforcing agent will cause foaming, the polymer becomes susceptible to scorching readily and the surface of the extruded formed body is roughened, and the workability of the extruding operation is decreased by burnt resin accompanied with the scorching. As for the method of adding a crystalline polymer, the hardness is increased, and the rubber properties, such as a permanent set of compression or elongation, are significantly decreased.

SUMMARY OF THE INVENTION

The present invention is achieved to solve the above described problems. One of the objects of the present invention is to provide a method of manufacturing a crosslinking formed body having a low hardness, superior tensile characteristics, and rubber properties.

The above object can be realized by a method comprising the steps of graft polymerizing ethylene-α olefin copolymer, polypropylene, and an organosilane compound in the presence of a free radical generating agent, forming a body of desired shape with the reaction product, and exposing the formed body to water in the presence of a silanol condensation catalyst to form a crosslinking formed body, or a method comprising the steps of graft polymerizing ethylene-α olefin copolymer and an organosilane compound in the presence of a free radical generating agent, forming a body of desired shape with a mixture of the reaction product and polypropylene, and exposing the formed body to water in the presence of a silanol condensation catalyst to form a crosslinking formed body.

In accordance with the present invention, an ethylene-α olefin copolymer, such as ethylene-butene-1 copolymer, ethylene propylene copolymer, ethylen-hexene copolymer, ethylene-octene copolymer, and the like, can be used. Particularly, in order to achieve the present invention, an ethylene propylene copolymer is preferable. Although any types of ethylene propylene copolymer are usable, a high ethylene type, of which the propylene content is in the range of 20~35 wt %, is preferable. The high ethylene type ethylene propylene copolymer is capable of being pelletized, and a compound manufacturing process, such as weighing, mixing, and the like, is readily automated. If the propylene content exceeds 35 wt %, pelletization tends to be difficult, and if the propylene content is less than 20 wt %, a rubber elasticity of the formed body tends to be lost.

Ethylene propylene copolymer, which contains, for instance, 2~9 wt % as copolymer, is preferable for use as the polypropylene in accordance with the present invention. Although either a block copolymerization or a random copolymerization can be used as the method of copolymerization, the block copolymerization method is preferable from the point of view of increasing the strength of the crosslinking formed body. If the content of ethylene is less than 2 wt %, a mutual solubility of polypropylene with ethylene-α olefin copolymer tends to decrease, and if the content of ethylene exceeds 9 wt %, the strength of the crosslinking formed body tends to decrease in accordance with the decreasing strength of the polypropylene itself.

A mixing ratio of ethylene-α olefin copolymer and polypropylene in the polymer component is desirably in the range of 70~85/30~15 (the former/the latter). If the content of polypropylene is less than 15 wt %, increasing the strength of the crosslinking formed body tends to be difficult, and if the content of polypropylene exceeds 30 wt %, the hardness is increased and the rubber properties tend to be decreased.

The organosilane compound is required to have both a functional group which is capable of being bonded to the polymer, and another functional group which is capable of silanol condensation. Practically, ethylenic unsaturated silane compounds, such as vinyl trimethoxysilane, vinyl triethoxysilane, vinyl triacetoxysilane, γ-methacryloxypropyl-triethoxysilane, vinyl tris (2-methoxyethoxy) silane, and the like, can be used as the organosilane compound.

The free radical generating agent is required to generate a free radical portion in the ethylene-α olefin copolymer. Practically, organoperoxides and organoperesters, such as benzoyl peroxide, dichlorobenzoyl peroxide, dicumyl peroxide, di-tertiary butyl peroxide, 2,5-dimethyl-2,5-di (peroxybenzoate) hexine-3, 1,3-bis(tertiary-butyl peroxyisopropyl) benzene, lauroyl peroxide, tertiary butylperacetate, 2,5-dimethyl-2,5-di(t-butylperoxy)hexine-3, 2,5-dimethyl-2,5-di(t-butylperoxy)hexine, tertiary butylperbenzoate, and the like, and azo compounds, such as azo bis-isobutylonitrile, dimethyl azo diisobutylate, and the like, can be used as the free radical generating agent.

Organotin compounds, such as dibutyltin dilaurate, dibutyltin diacetate, dibutyltin dioctate, and the like, can be used as the silanol condensation catalyst.

In accordance with the crosslinking formed body of the present invention, micropolypropylene components which are approximately 2 μm in size are dispersed uniformly in the ethylene-α olefin copolymer component, and the micropolypropylene components operate as a reinforcing agent (organic polymer filler). Therefore, a crosslinking formed body having a low hardness and superior tensile characteristics and rubber properties can be realized. Particularly, in accordance with a method, wherein polypropylene is mixed with a graft polymer obtained by a graft reaction of ethylene-α olefin copolymer, formed in a desired shape, and crosslinked, the polypropylene component is dispersed in a finer manner than ever, and more superior tensile characteristics can be realized.

In accordance with the present invention, any oxidation inhibitors, stabilizers, coloring agents, lubricants, and the like can be mixed in addition to the above components. However, in accordance with the present invention, an inorganic reinforcer, such as carbon black, and the like is not necessarily required to be mixed, because polypropylene operates as a reinforcing component. Carbon black can be added as a coloring agent.

The graft reaction of the organosilane compounds can be performed using any one of a kneader, mixer, and extruder. However, the extruder is preferable in view of easiness for automation.

DESCRIPTION OF THE PREFERRED EMBODIMENTS

Hereinafter, the present invention will be explained practically with reference to various embodiments. However, the present invention is not restricted by the embodiments.

Method of Manufacturing I for Embodiments 1~9
(1) Blending step

In accordance with the blending ratio indicated in Table 1 and Table 2, each of a ethylene propylene copolymer, polypropylene, and a black color batch was weighed, so as to be 3.06 kg in total weight, and blended sufficiently by a dry blender. Subsequently, blended resin pellets were formed by fusing and mixing using a 30 mm extruder. The temperature condition set at the extruder was cylinder 1: 160° C., cylinder 2: 220° C., cylinder 3: 220° C., and head: 200° C.

(2) Silane graft reaction step

A vinyl silane blended solution was prepared by mixing and dissolving dicumylperoxide 10 parts by weight, 2,2'-thio-diethylene bis[3-(3, 5 di-t-butyl-4-hydroxyphenyl) propionate] (an oxidation inhibitor) 10 parts by weight, and 4,4'-thio bis-(6-tertiary-butyl-3-methylphenol) (an oxidation inhibitor) 1 (one) part by weight into 100 parts by weight of vinyl trimethoxysilane.

The vinyl silane blended solution of 48.4 g was impregnated into the blended resin pellets of 2 kg obtained in the above step (1) by mixing sufficiently in a sealed vessel. Subsequently, the blended resin pellets impregnated with the vinyl silane solution were fused and kneaded in a 30 mm dual axes extruder, of which portions were heated at the same temperature as the above step (1), to obtain graft polymer by a silane graft reaction.

(3) Catalyst master batch mixing step

A compound was prepared by impregnating dibutyltin dilaurate of one part by weight into ethylene propylene copolymer of 100 parts by weight by mixing in a bag made of polyethylene. Subsequently, a catalyst master batch was manufactured by fusing and kneading the compound in the same manner as the above step (2).

(4) Sheet forming step

A sheet 2 mm thick was formed by the steps of:
(a) mixing the graft polymer manufactured in the above step (2) and the catalyst master batch manufactured in the above step (3) in a ratio of 19/1 (as graft polymer/catalyst master batch) by weight,
(b) kneading the mixture for 5 minutes by a 6 inch test roller, which had been heated to approximately 180° C. at its roller surface, and
(c) pressing the mixture to form a sheet of 2 mm thick.

The pressing was performed by pressing for 2 minutes after a pre-heating at 130° C. for 3 minutes.
(5) Crosslinking step A crosslinking reaction was performed by keeping the sheet manufactured in the above step (4) at 80° C. for 16 hours.

Method of Manufacturing II for Embodiment 10
(1) Step of resin blending and silane graft reaction In accordance with the blending ratio indicated in Table 2, each of a ethylene propylene copolymer, polypropylene, and a black color batch was weighed, so as to be 3.06 kg in total weight, and blended sufficiently by a dry blender. Subsequently, the same vinyl silane blended solution as that in the method of manufacturing I was impregnated into the blended resin pellets of 2 kg obtained in the above step (1) by mixing sufficiently in a sealed vessel. Subsequently, the blended resin pellets impregnated with the vinyl silane solution were fused and kneaded in a 30 mm dual axes extruder, of which portions were heated at the same temperature as the above method of manufacturing I, to obtain graft polymer by a silane graft reaction.

(2) Catalyst master batch mixing step

Catalyst master batch was manufactured by the same method as the step (3) of the method of manufacturing I.

(3) Sheet forming step

A sheet of 2 mm thick was formed by pressing in the same manner as the step (4) of the method of manufacturing I.

(4) Crosslinking step

The crosslinking was performed by the same step as the step (5) of the method of manufacturing I.

Method of Manufacturing III for Embodiments 11~14

(1) Silane graft reaction step of ethylene propylene copolymer

In accordance with the blending ratio indicated in Table 2, an ethylene propylene copolymer and the same vinyl silane blended solution as that in the method of manufacturing I were mixed sufficiently in a sealed vessel so that the vinyl silane solution was impregnated into the copolymer resin pellets. Subsequently, the blended resin pellets impregnated with the vinyl silane solution were fused and kneaded in a 30 mm dual axes extruder, of which portions were heated at the same temperature as the above method of manufacturing I, to obtain graft polymer of ethylene propylene copolymer by a silane graft reaction.

(2) A step of kneading ethylene propylene copolymer graft polymer, polypropylene, and black color batch An amount of each of polypropylene and a black color batch corresponding to the amount of the ethylene propylene copolymer graft polymer was weighed, and the above three components were mixed. The mixed resin was fused and kneaded in a 30 mm² axial extruder, of which portions were heated at the same temperature as the above method of manufacturing I.

(3) Catalyst master batch mixing step

Catalyst master batch was manufactured by the same method as the step (3) of the method of manufacturing I.

(4) Sheet forming step

A sheet of 2 mm thick was formed by pressing in the same manner as the step (4) of the method of manufacturing I.

(5) Crosslinking step

The crosslinking was performed by the same step as the step (5) of the method of manufacturing I.

Embodiments 15,16

In accordance with the mixing ratio indicated in Table 3, crosslinking formed sheets were prepared by the same method as the method of manufacturing I, using each of an ethylene butene-1 copolymer and an ethylene octane copolymer instead of an ethylene propylene copolymer.

Comparative Examples 1~3

In accordance with the mixing ratio indicated in Table 3, cross linking formed sheets were prepared using polymer compositions which did not contain polypropylene.

Embodiments 17~23

The crosslinking formed sheets were prepared in the same manner as the embodiment 14 except the black color batch in the embodiment 14 was replaced with each of the color batches shown in respective examples in Table 4.

Compositions of each of the color batches shown in Table 4 are as follows:

white color batch; polyethylene 62 wt %+titanium oxide 38 wt %, brown color batch; polyethylene 74 wt %+titanium oxide 12 wt %+red iron oxide 11.5 wt %+polyazoyellow 2.5 wt %, violet color batch; polyethylene 75 wt %+titanium oxide 22 wt %+cyanine blue 1 wt %+polyazored 2 wt %, red color batch; polyethylene 76 wt %+polyazored 24 wt %, green color batch; polyethylene 64 wt %+titanium oxide 20 wt %+cyanine green 4 wt %+polyazoyellow 12 wt %, blue color batch; polyethylene 76 wt %+titanium oxide 20 wt %+cyanine blue 4 wt %, and yellow color batch; polyethylene 67 wt %+titanium oxide 20 wt %+polyazoyellow 13 wt %.

Characteristics of the crosslinking formed sheets manufactured in the embodiments and the comparative examples are indicated in Table 1~4. The tensile strength, elongation, and hardness (JIS, A) were determined in accordance with the tensile test defined by the article (3) of JISK 6301. The compressive permanent distortion was determined in accordance with the compressive permanent distortion test defined by the article (10) of JISK 6301.

TABLE 1

(Mixing amount unit is parts by weight)

| Examples | Embodiments | | | | | | |
|---|---|---|---|---|---|---|---|
| Items | 1 | 2 | 3 | 4 | 5 | 6 | 7 |
| PP[1] (ET[2] content:0 wt %) | — | — | — | — | — | — | 30 |
| PP (ET content:3 wt %) | 10 | 15 | 20 | 25 | 30 | 35 | — |
| ET + propylene copolymer (propylene:27 wt %) | 90 | 85 | 80 | 75 | 70 | 65 | 70 |
| Black color batch[3] | 2 | 2 | 2 | 2 | 2 | 2 | 2 |
| Vinyltrimethoxysilane | 2 | 2 | 2 | 2 | 2 | 2 | 2 |
| Dicumylperoxide | 0.2 | 0.2 | 0.2 | 0.2 | 0.2 | 0.2 | 0.2 |
| Thio propionate[4] | 0.2 | 0.2 | 0.2 | 0.2 | 0.2 | 0.2 | 0.2 |
| Methyl phenol[5] | 0.02 | 0.02 | 0.02 | 0.02 | 0.02 | 0.02 | 0.02 |
| Catalyst master batch | 5 | 5 | 5 | 5 | 5 | 5 | 5 |
| Manufacturing method | I | I | I | I | I | I | I |
| C.[9] Tensile strength[6] | 36 | 45 | 62 | 104 | 122 | 164 | 95 |
| Elongation (%) | 180 | 190 | 210 | 300 | 330 | 400 | 300 |
| Hardness (JIS A) | 66 | 72 | 73 | 75 | 79 | 88 | 80 |
| Comp. perm. distort.[7] | 12 | 14 | 16 | 18 | 21 | 25 | 23 |
| Comp. perm. distort.[8] | 16 | 18 | 21 | 24 | 33 | 38 | 35 |

Remarks: (Same in the following Tables 2 ~ 4)
[1]: Polypropylene, [2]: Ethylene, [3]: Poly ethylene 94 wt % + carbon black 6 wt %, [4]: 2,2'-thio-diethylene bis[3-(3,5 di-t-butyl-4-hydroxyphenyl) propionate], [5]: 4,4'-thio bis-(6-t-butyl-3-methyl phenol), [6]: (kg/cm²), [7]: Compressive permanent distortion (%) at 70° C. after 22 hours, [8]: Compressive permanent distortion (%) at 100° C. after 70 hours, [9]: Characteristics.

TABLE 2

(Mixing amount unit is parts by weight)

| Examples | Embodiments | | | | | | |
|---|---|---|---|---|---|---|---|
| Items | 8 | 9 | 10 | 11 | 12 | 13 | 14 |
| PP[1] (ET[2] content:0 wt %) | — | — | — | — | — | — | — |
| PP (ET content:3 wt %) | — | — | 25 | 17.5 | 20 | 22.5 | 25 |
| PP (ET content:8 wt %) | 30 | — | — | — | — | — | — |
| PP (ET content:12 wt %) | — | 30 | — | — | — | — | — |
| ET + propylene copolymer (propylene:27 wt %) | 70 | 70 | 75 | 82.5 | 80 | 77.5 | 75 |
| Black color batch[3] | 2 | 2 | 2 | 2 | 2 | 2 | 2 |
| Vinyltrimethoxysilane | 2 | 2 | 2 | 2 | 2 | 2 | 2 |
| Dicumylperoxide | 0.2 | 0.2 | 0.2 | 0.2 | 0.2 | 0.2 | 0.2 |
| Thio propionate[4] | 0.2 | 0.2 | 0.2 | 0.2 | 0.2 | 0.2 | 0.2 |

TABLE 2-continued (Mixing amount unit is parts by weight)

| Examples | Embodiments | | | | | | |
|---|---|---|---|---|---|---|---|
| Items | 8 | 9 | 10 | 11 | 12 | 13 | 14 |
| Methyl phenol[5] | 0.02 | 0.02 | 0.02 | 0.02 | 0.02 | 0.02 | 0.02 |
| Catalyst master batch | 5 | 5 | 5 | 5 | 5 | 5 | 5 |
| Manufacturing method | I | I | II | III | III | III | III |
| C.[9] Tensile strength[6] | 116 | 90 | 99 | 94 | 108 | 125 | 136 |
| Elongation (%) | 350 | 340 | 320 | 330 | 340 | 360 | 330 |
| Hardness (JIS A) | 77 | 79 | 73 | 65 | 69 | 72 | 75 |
| Comp. perm. distort.[7] | 22 | 20 | 19 | 13 | 15 | 16 | 16 |
| Comp. perm. distort.[8] | 34 | 31 | 25 | 19 | 21 | 22 | 23 |

TABLE 3

(Mixing amount unit is parts by weight)

| Examples | Embodiments | | Comparative examples | | | |
|---|---|---|---|---|---|---|
| Items | 15 | 16 | 1 | 2 | 3 | 4 |
| PP (ET content:3 wt %) | 20 | 20 | — | — | — | EP rubber |
| ET + propylene copolymer (propylene:27 wt %) | — | — | 100 | — | — | |
| ET + butene-1 copolymer (butene-1:20 wt %) | 80 | — | — | 100 | — | |
| ET + octane copolymer (octane:24 wt %) | — | 80 | — | — | 100 | |
| Black color batch[3] | 2 | 2 | 2 | 2 | 2 | |
| Vinyltrimethoxysilane | 2 | 2 | 2 | 2 | 2 | |
| Dicumylperoxide | 0.2 | 0.2 | 0.2 | 0.2 | 0.2 | |
| Thio propionate[4] | 0.2 | 0.2 | 0.2 | 0.2 | 0.2 | |
| Methyl phenol[5] | 0.02 | 0.02 | 0.02 | 0.02 | 0.02 | |
| Catalyst master batch | 5 | 5 | 5 | 5 | 5 | |
| Manufacturing method | I | I | I | I | I | |
| C.[9] Tensile strength[6] | 325 | 180 | 28 | 120 | 89 | 121 |
| Elongation (%) | 530 | 620 | 170 | 290 | 340 | 430 |
| Hardness (JIS A) | 85 | 76 | 60 | 90 | 80 | 71 |
| Comp. perm. distort.[7] | 19 | 20 | 10 | 13 | 15 | 15 |
| Comp. perm. distort.[8] | 25 | 27 | 15 | 29 | 31 | 22 |

TABLE 4

(Mixing amount unit is parts by weight)

| Examples | Embodiments | | | | | | |
|---|---|---|---|---|---|---|---|
| Items | 17 | 18 | 19 | 20 | 21 | 22 | 23 |
| PP[1] (ET[2] content:3 wt %) | 25 | 25 | 25 | 25 | 25 | 25 | 25 |
| ET + propylene copolymer (propylene:27 wt %) | 70 | 70 | 70 | 70 | 70 | 70 | 70 |
| White color batch | 2 | — | — | — | — | — | — |
| Brown color batch | — | 2 | — | — | — | — | — |
| Violet color batch | — | — | 2 | — | — | — | — |
| Red color batch | — | — | — | 2 | — | — | — |
| Green color batch | — | — | — | — | 2 | — | — |
| Blue color batch | — | — | — | — | — | 2 | — |
| Yellow color batch | — | — | — | — | — | — | 2 |
| Vinyltrimethoxysilane | 2 | 2 | 2 | 2 | 2 | 2 | 2 |
| Dicumylperoxide | 0.2 | 0.2 | 0.2 | 0.2 | 0.2 | 0.2 | 0.2 |
| Thio propionate[4] | 0.2 | 0.2 | 0.2 | 0.2 | 0.2 | 0.2 | 0.2 |
| Methyl phenol[5] | 0.02 | 0.02 | 0.02 | 0.02 | 0.02 | 0.02 | 0.02 |
| Catalyst master batch | 5 | 5 | 5 | 5 | 5 | 5 | 5 |
| Manufacturing method | III | III | III | III | III | III | III |

TABLE 4-continued (Mixing amount unit is parts by weight)

| Examples | | Embodiments | | | | | | |
|---|---|---|---|---|---|---|---|---|
| Items | | 17 | 18 | 19 | 20 | 21 | 22 | 23 |
| C.[9] | Tensile strength[6] | 137 | 133 | 138 | 139 | 137 | 133 | 136 |
| | Elongation (%) | 320 | 320 | 310 | 330 | 330 | 330 | 340 |
| | Hardness (JIS A) | 77 | 76 | 78 | 77 | 77 | 77 | 76 |
| | Comp. perm. distort.[7] | 16 | 16 | 16 | 16 | 16 | 16 | 16 |
| | Comp. perm. distort.[8] | 23 | 23 | 23 | 23 | 23 | 23 | 23 |

In accordance with the embodiments 1~23 of the present invention, it is revealed that the crosslinking formed body of the present invention has a low hardness, and a superior tensile strength and rubber properties. Furthermore, the crosslinking formed body having a smooth surface can be realized, because no inorganic reinforcer, such as carbon black, is used.

In accordance with the embodiments 14, 17~23, it is revealed that, even if the crosslinking formed body is colored by adding various coloring batches, approximately the same characteristics as the body manufactured without the coloring batch can be realized.

In accordance with the present invention, the productivity can be improved significantly because the kneading process and the crosslinking process are simplified, in addition to the fact that it is possible to realize characteristics which are equal to or more preferable in comparison with conventional ethylene propylene rubber (EP rubber, comparative example 4).

In accordance with the present invention, a crosslinking formed body having a low hardness and rubber properties, which is capable of being colored in an arbitrary way, can be realized.

What is claimed is:

1. A method of manufacturing a crosslinking formed body comprising the steps of:

graft polymerizing ethylene-α olefin copolymer, polypropylene, and an organosilane compound in the presence of a free radical generating agent to form a reaction product, wherein a content ratio by % weight of ethylene-α olefin copolymer and polypropylene is in the range of 70–85/30–15 (ethylene-α olefin copolymer/polypropylene), forming said reaction product into a desired shape formed body, and crosslinking the formed body by any of exposing of moisture and dipping into water in the presence of a silanol catalyst, wherein the crosslinking formed body contains the polypropylene as a micropolypropylene component dispersed in the ethylene-α olefin copolymer component.

2. A method of manufacturing a crosslinking formed body as claimed in claim 1, wherein said graft polymerization is performed by the steps of:
fusing and mixing said ethylene-α olefin copolymer and polypropylene in an extruder to form mixed pellets in the extruder,
impregnating said organosilane compound into said mixed pellets, and
graft polymerizing said impregnated mixed pellets in the presence of said free radical generating agent in said extruder.

3. A method of manufacturing a crosslinking formed body as claimed in claim 1, wherein said graft polymerization is performed by the steps of:
impregnating said organosilane compound into a mixture of said ethylene-α olefin copolymer and polypropylene, and
graft polymerizing said impregnated mixture in the presence of said free radical generating agent in an extruder.

4. A method of manufacturing a crosslinking formed body as claimed in any one of claims 1 to 3, wherein said ethylene-α olefin copolymer is ethylene propylene copolymer or ethylene propylene rubber.

5. A method of manufacturing a crosslinking formed body as claimed in a claim 4, wherein said ethylene propylene copolymer, or ethylene propylene rubber, contains propylene in the range of 20~35 % by weight.

6. A method of manufacturing a crosslinking formed body as claimed in any one of claims 1 to 3, wherein said polypropylene contains ethylene component in the range of 2~9 % by weight.

7. A method of manufacturing a crosslinking formed body comprising the steps of:

graft polymerizing ethylene-α olefin copolymer and an organosilane compound in the presence of a free radical generating agent to form a graft reaction product, blending said graft reaction product with polypropylene to obtain a mixture, wherein a content ratio by % weight of ethylene-α olefin copolymer and polypropylene is in the range of 70~85/30~15 (ethylene-α olefin copolymer/polypropylene, forming said mixture into a desired shape formed body, and crosslinking the formed body by exposing to moisture in the presence of a silanol catalyst, wherein the crosslinking formed body contains the polypropylene as a micropolypropylene component dispersed in the ethylene-α olefin copolymer component.

8. A method of manufacturing a crosslinking formed body as claimed in claim 7, wherein said ethylene-α olefin copolymer is ethylene propylene copolymer.

9. A method of manufacturing a crosslinking formed body as claimed in claim 8, wherein said ethylene propylene copolymer contains propylene in the range of 20~35 % by weight.

10. A method of manufacturing a crosslinking formed body as claimed in claim 7, 8 or 9, wherein said polypropylene is an ethylene copolymer type polypropylene containing ethylene component in the range of 2~9 % by weight.

11. A method of manufacturing a crosslinking formed body as claimed in claim 4, wherein said polypropylene contains ethylene component in the range of 2~9 % by weight.

12. A method of manufacturing a crosslinking formed body as claimed in claim 5, wherein said polypropylene contains ethylene component in the range of 2~9 % by weight.

13. A method of manufacturing a crosslinking formed body as claimed in claim 1, wherein said reaction product consists essentially of the graft polymerization product of the ethylene-α olefin copolymer, the polypropylene and the organosilane compound.

14. A method of manufacturing a crosslinking formed body as claimed in claim 7, wherein said reaction product consists essentially of the graft polymerization product of the ethylene-α olefin copolymer and the organosilane compound.

15. A method of manufacturing a crosslinking formed body as claimed in claim 1, wherein the polypropylene is a reinforcing component of the crosslinking formed body.

16. A method of manufacturing a crosslinking formed body as claimed in claim 7, wherein the polypropylene is a reinforcing component of the crosslinking formed body.

* * * * *